Sept. 3, 1957     H. BURR     2,805,180
ELECTRIC CABLE

Filed May 16, 1955     2 Sheets-Sheet 1

Inventor
Harvey Burr
By
Watt Mackey + Burden
Attorney

Sept. 3, 1957     H. BURR     2,805,180
ELECTRIC CABLE
Filed May 16, 1955     2 Sheets-Sheet 2
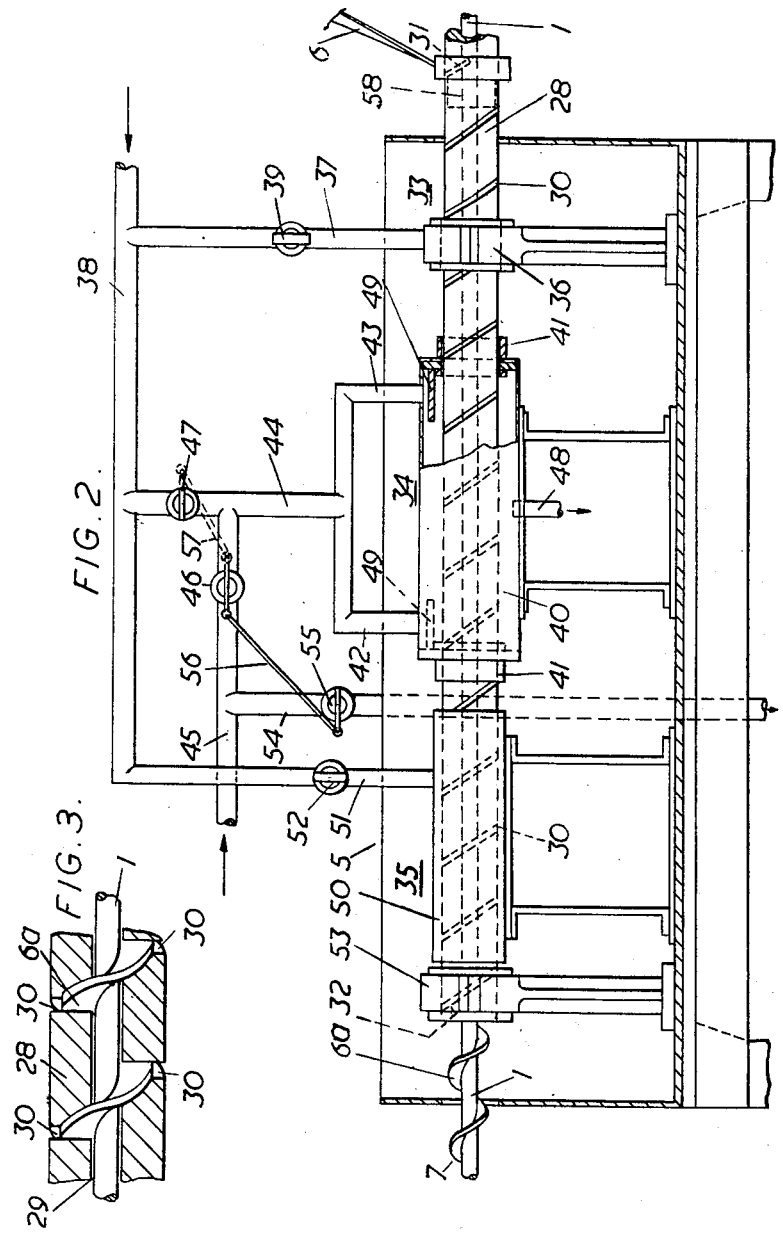
Inventor
Harvey Burr
By
Abbott Mackey + Burden
Attorney

United States Patent Office 2,805,180
Patented Sept. 3, 1957

2,805,180

ELECTRIC CABLE

Harvey Burr, Liverpool, England, assignor to British Insulated Callender's Cables Limited, London, England, a British company Application May 16, 1955, Serial No. 508,642

Claims priority, application Great Britain May 19, 1954

4 Claims. (Cl. 154—2.26)

The invention is concerned with the manufacture of coaxial conductor electric cable for high frequency signal transmission of the form in which the insulation between the two conductors consists wholly or in part of a strip of insulating material arranged as a helical open turn winding on and extending radially from the inner conductor. The inner conductor is usually a single wire, but it may consist of several wires stranded together or even be of tubular form. The term "wire" is used hereinafter to denote those various forms. In the specification of our patent application Serial No. 353,173 there are described a method and an apparatus for applying to a wire such a strip of thermoplastic insulating material, for instance polyethylene. The present invention provides a modified form of such an arrangement.

In accordance with the earlier specification the thermoplastic strip is fed continuously to a helical moulding cavity concentric with and rotated about the wire which is drawn continuously through an axial passage in the mould. The moulding cavity opens into the axial passage to permit the strip to engage the surface of the wire. The strip is wound into the helical form in the mould by supply means rotating about the wire at the speed of rotation of and in the same sense as the mould. The strip supply means may be a reel revolving bodily about the wire or may be a rotatable guide which unwinds the strip from a reel arranged coaxial with the wire. The supply means may be provided with an adjustable friction brake to produce a susbtantially constant back tension in the strip. The strip is heated at or near its entry to the mould to soften it sufficiently to enable it to be moulded to the required form and the moulded helix then passes through a cooling zone as it advances with the wire.

In the improved arrangement of the present invention the helical mould is preceded by a forming guide in which the unheated strip is bent into the helical form before it enters the mould. Several turns of the helix are formed in the forming guide which in conjunction with the moving wire acts like a capstant to apply the necessary tensile force to draw the strip from the supply and to present it at the entrance to the mould in a condition in which the tensile force is not present in the strip or is only small. The mould is heated to soften and mould the helix which passes through a cooling zone as it leaves the mould.

The forming guide may be a rearward extension of the helical mould and the cooling zone may be provided in a forward extension of the mould. The mould is surrounded by a heating jacket and close to the entry to the mould a short cooling zone may be provided to prevent heat reaching the guide from the heated mould.

By means of the improved arrangement the strip is drawn under substantially constant tension from the supply and initially bent into the helical form before becoming softened by heating, that is before its tensile strength is reduced.

One form of construction of the improved arrangement is described hereinafter by way of example and with reference to the accompanying diagrammatic drawings, wherein:

Figure 2 is a side view in part section of the part of the apparatus in which the strip is actually applied to the wire; and Figure 3 is a fragmentary view in part section of the mandrel during operation.

Figure 1:
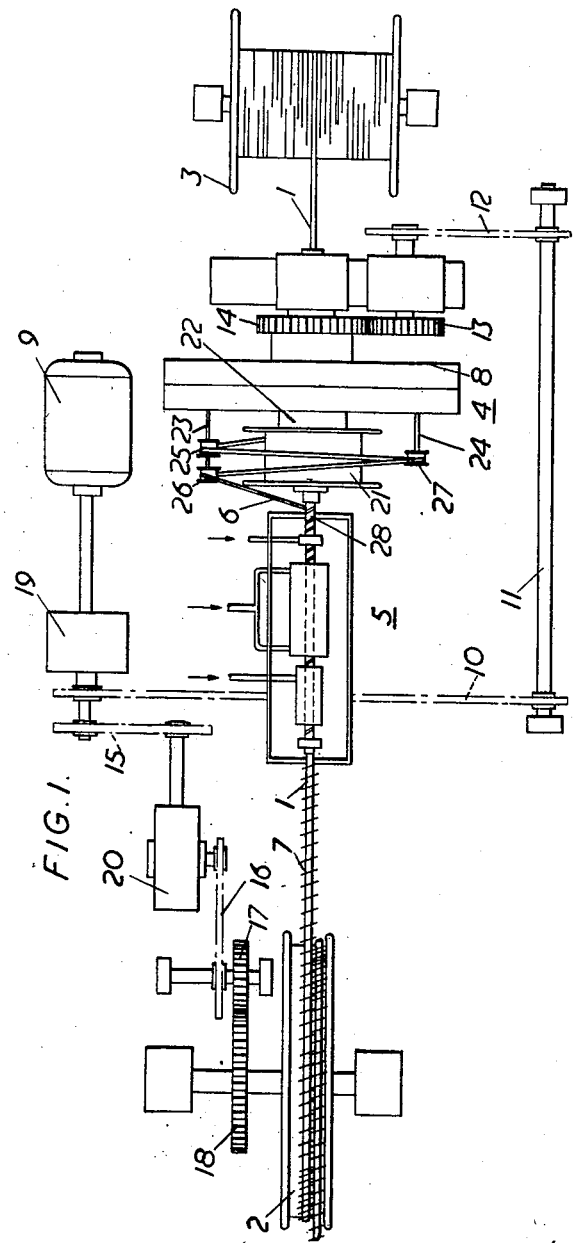
Figure 1 is a view in plan of a machine incorporating the invention.

The wire 1 is drawn by a capstan 2 from a reel 3 mounted at the back of the machine. The wire 1 passes in succession through a strip applying head 4 rotated about the path of the wire and a forming unit 5. The head 4 applies a strip 6 of polyethylene helically about the wire as the wire moves forward, the strip being edge on to the wire, that is with its larger transverse dimension extending radially from the wire. In the forming unit 5 the strip is subjected to the appropriate temperatures to cause it to assume permanently the form of an open turn helical membrane 6a and from the front of this unit 5 the insulated wire 7 passes to the capstan 2. The head 4 comprises a rotatable carriage 8 driven by an electric motor 9 through a chain 10, shaft 11, chain 12 and gears 13, 14. The capstan 2 is driven from the same electric motor 9 through chains 15, 16 and gears 17, 18. Relative speed control is obtained by gear boxes 19, 20.

A reel 21 of the tape 6 is mounted co-axially on a shaft 22 extending forwardly from the front of the cariage 8.

The reel 21 is mounted on the shaft 22 by means including a friction brake permitting the reel to rotate relatively to the shaft 22 as the tape 6 is drawn therefrom and being automatically controllable by an arrangement incorporated in the carriage 8, and forming in itself no part of this invention, to maintain substantially constant the tension in the strip at its entry to the forming unit 5. In its passages from the reel, the tape passes over guide rollers 25, 26 and 27 which are freely rotatable on spindles 23 and 24 shown extending forward from the front of the carriage 8. The spindle 23, which carries the final guide roller 26 from which the tape 6 passes to the forming unit 5, is a fixture on the carriage 8. The other spindle 24 constitutes part of the tension-controlling arrangement which is not otherwise illustrated.

The main element of the forming unit 5 is a single mandrel 28, see Figures 2 and 3. The mandrel 28 is fixed to the forward end of the shaft 22 on the carriage, so that the mandrel rotates with the carriage about the path of movement of the wire 1. The mandrel 28 is provided with an axial bore 29 for the passage of the wire 1. A single helical radial slot 30 in the wall of the mandrel is open to the inner and outer surfaces. The slot 30 begins at 31 near the rearward end of the mandrel to form an entry for the strip 6 and opens into the end face 32 of the mandrel at its forward end to form an exit for the helical membrane 6a. The mandrel 28 extends through three zones 33, 34 and 35. The first is the initial forming zone 33, and in this zone the unheated strip 6 is bent into the helical form before it passes to the heating zone 34. This zone 33 includes several turns of the radial slot 30. Just before entering the heating zone 34 the mandrel 28 is supported in a bearing 36 to which a supply of cold water can be fed by a pipe 37 from a cold water manifold 38 through a control valve 39. This applies sufficient cooling over a short length of the mandrel 28 to prevent the transmission of heat from the heating zone 34 to the first part of the mandrel constituting the initial forming zone 33. The next portion of the mandrel 28 constitutes the heating zone 34 in which the strip is softened. This zone is provided by a closed heating chamber 40 provided at each end with seals 41 where the mandrel 28 extends through and is rotatable relative to the end walls of the chamber. The chamber 40 can be supplied with steam through two pipes 42 and 43, one at each end of the chamber. The two pipes 42, 43 branch from a common supply pipe 44 which can be fed with steam from a main steam inlet pipe 45 through a valve 46 or with cold water from the cold water manifold 38 through a valve 47. Under operating conditions the cold water valve 47 is closed and the steam valve 46 is open, as shown in Figure 2. An exhaust pipe 48 is provided about midway along the length of the heating chamber 40. Inside the chamber 40 and close to the end of the steam pipes 42, 43 are arranged baffle plates 49 which prevent the entering steam from impinging directly on the mandrel 28, thus serving to prevent the generation of hot spots near the steam entries. The arrangement of the steam entries at the ends of the heating chamber in connection with the baffle plates and the central exhaust tend to the production of a substantially uniform temperature through the length of the chamber. Beyond the heating zone 34 the mandrel is surrounded by the cooling zone 35 provided by a cooling chamber 50 fed with cold water through a pipe 51 and a valve 52 from the cold water manifold 38. Beyond the cooling chamber 50 the forward end of the mandrel 28 is supported in a bearing 53.

On the supply side of the main steam valve 46 an auxiliary exhaust pipe 54 is taken from the steam supply pipe 45 through a valve 55. The valves 46 and 55 are mechanically interconnected by a link 56 which ensures that both valves operate simultaneously and that one is closed when the other is open. There may be provided also a similar link 57 interconnecting the steam valve 46 with the cold water valve 47 to ensure that when one valve is closed the other is open. This last linkage will ensure that steam and cold water will not be fed simultaneously to the heating chamber 40, the valves and linkage being so designed that one valve will not open until the other is completely closed. It is preferable not to use the link 57, the cold water valve 47 being independently operated by hand.

The manner of operation of the device is as follows. With the wire 1 threaded through the mandrel 28 and on to the capstan 2, the end of the insulating strip 6 is drawn from the reel 21 and wrapped into place throughout the complete length of the helical slot 30 and its leading end is bound on to the wire in front of the bearing 53. The strip 6 enters the slot 30 under a cover-plate 58 which assists its complete entry into the slot. Cold water is fed to the first bearing 36 through the open valve 29 and to the cooling chamber 50 through the open valve 52. The steam valve 46 is opened to feed steam into the heating chamber 40, the associated steam valve 55 and cold water valve 47 being closed. The drive is now started so that the wire 1 is drawn through the apparatus, carrying with it the strip 6a wound thereon as the mandrel 28 and strip-applying head 4 rotate together. The relation between the speeds of rotation of the carriage 8, therefore of the guide roller 26 about the wire, and of the capstan 2 is so adjusted, by means of the control gears 19 and 20, that the wire advances a distance equal to the pitch of the helical slot 30 for each revolution of the carriage. The reel 21 rotates relative to the rest of the head 4 as the strip is drawn from it. In the initial forming zone 33 the unheated strip 6 is bent into the helical form, the part of the mandrel 28 in this zone acting in conjunction with the wire, on the several turns of the strip, like a capstan to apply the necessary tensile force to draw the strip from the reel 21 and to present it to the heated part of the mandrel, in the heating chamber 40, in a condition in which tensile force is not present in the strip or is only small. In the usual operation of a capstan, the barrel portion rotates while the fleeting member is stationary as the member to be wound on the capstan approaches the barrel in a substantially fixed direction. In the present arrangement the barrel of the capstan is provided by the wire which does not rotate, the required relative movement of the parts being provided by rotating the fleeting member, formed by the radial face of the slot 30, and with it the direction of approach of the strip 6 to the wire. Thereafter, in the heating chamber 40, the strip is softened so that it assumes the required helical form in which any internal stresses, set up by bending the strip about the wire 1, are eliminated. In the subsequent cooling chamber 50 the strip cools and the thermoplastic material returns to its set state in the helical form 6a.

One advantage of the improved arrangement is that its operation can be stopped and re-started without damaging, by overheating, the thermoplastic material in the mould, that is in the part of the mandrel 28 in the heating chamber 40. When the machine is stopped the steam is diverted to exhause by closing valve 46 and simultaneously opening valve 55. Cold water is fed to the heating chamber, if necessary, by opening valve 47. Due to the comparatively small mass of metal and thermoplastic material in the mandrel, the latter quickly cools. In preparation for re-starting, steam is again fed to the heating chamber 40 and this produces the operating temperature in a comparatively short time. Appropriate instruments are associated with the apparatus to indicate when the required temperature conditions are attained.

Where it is desired to apply a tape of a material having a softening temperature higher than can conveniently be obtained by using steam as the heating fluid, other fluids may be employed in place of steam. Alternatively there may be employed a high frequency induction heating arrangement.

Although the invention has been described in connection with the application of a single tape, it may also be used for the application of several tapes to form a two-, three- or more start helix on the wire. In such cases the mandrel 28 will be formed appropriately with more than one helical slot 30 and the source of supply of tape will be modified to supply the required number of tapes. In such an arrangement the reels of tape may be arranged on a rotating carriage in such a manner that each reel is carried bodily round the path of wire.

What I claim as my invention is:

1. Apparatus for applying a flat thermo-plastic strip about a longitudinally advancing wire as an open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and providing opposed radially extending support-surfaces for the major surfaces of the strip, a source of supply of strip and, between said source and said mould, a forming guide for performing the strip into the helical form and advancing it from the source to the mould, means for heating the strip in the mould, means for cooling the winding of strip as it leaves the mould and means for rotating the mould, the forming guide and the source of supply together about the advancing wire.

2. Apparatus as claimed in claim 1, in which the forming guide is an extension of the helical mould.

3. Apparatus for applying a flat thermo-plastic strip about a longitudinally advancing wire as an open-turn helical fin in contact with, and extending radially from, the wire, comprising a hollow cylindrical mandrel concentric with the path of the wire, the mandrel being formed with a radial, parallel-walled helical slot concentric with and opening into the hollow centre of the mandrel from near the rearward end to the forward end of the mandrel, a source of supply of strip and means for rotating the mandrel and said source of supply together about the advancing wire, a heating chamber surrounding a mid-portion of the mandrel, a cooling chamber surrounding the forward portion of the mandrel, and the rearward portion of the mandrel, between the source of supply and the heating chamber, being a forming guide for preforming the strip into the helical form and advancing the strip from the source of supply into the mid-portion of the mandrel.

4. Apparatus as claimed in claim 3, provided with cooling means at the junction of the mid-portion of the mandrel and the rearward portion to prevent transfer of heat from said mid-portion to said rearward portion.

References Cited in the file of this patent

UNITED STATES PATENTS

| 2,065,561 | Boyle et al. | Dec. 29, 1936 |
| 2,566,846 | Martin | Sept. 4, 1951 |

FOREIGN PATENTS

| 575,745 | France | April 26, 1923 |